Patented Sept. 12, 1933

1,926,567

UNITED STATES PATENT OFFICE 1,926,567

KETO-ALCOHOL

Robert H. Van Schaack, Jr., Evanston, Ill., assignor to Van Schaack Bros. Chemical Works, Inc., Chicago, Ill., a corporation of Illinois No Drawing. Application December 17, 1929, Serial No. 414,832

5 Claims. (Cl. 260—134)

This invention relates to keto-alcohols and particularly to products of the condensation of acetone with methyl ethyl ketone and higher ketones.

The invention may be illustrated by the product of the reaction of acetone with methyl ethyl ketone in the presence of an alkaline condensing agent. The reaction product comprises 4-hydroxy-4-methyl-2-hexanone,

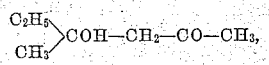

and its isomer, 5-hydroxy-5-methyl-3-hexanone.

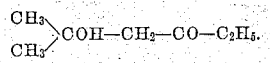

The proportion of the two isomers formed may vary with the conditions of the reaction. Also, one isomer may be formed practically to the exclusion of the other.

Details of an illustrative method for preparing these ketones follow.

One molecular proportion of substantially dry acetone is agitated with one or two molecular proportions of methyl ethyl ketone and a small amount of caustic soda that has been finely ground with twice its weight of precipitated calcium carbonate. The amount of the ground mixture of alkali and calcium carbonate used is suitably five parts by weight to one thousand parts of the ketones. The temperature at which the agitation is made may be below 25° C. The agitation is continued for sufficient time to cause the reaction of a substantial amount of the acetone with methyl ethyl ketone, to give a product of higher specific gravity and higher boiling point than either of the original ketones. Thus, I have continued the agitation for twenty-two hours. During these twenty-two hours agitation, liquid was continuously filtered from the mixture and delivered to an evaporator containing succinic acid in excess of the alkali dissolved in the filtered liquor and maintained at a temperature above the boiling point of methyl ethyl ketone. The resulting vapors, comprising unreacted acetone and methyl ethyl ketone, were passed through a condenser and the condensate therefrom returned to the reaction vessel. In this manner, keto-alcohol (which does not boil at a low temperature) was retained in the evaporator from which it was removed from time to time by means of a draw-off valve. After twenty-two hours reaction as above described, approximately 40% of the weight of the original ketones was obtained in the form of a fraction of high boiling point. This was then submitted to partial distillation, in a vacuum, to remove a foreshot comprising acetone and methyl ethyl ketone that had not been distilled away during the continuous evaporation of liquid filtered from the reaction vessel. The residue from this distillation comprises the keto-alcohols (substituted hexanones) of the formulas given above.

The process may be applied to the manufacture of other keto-alcohols, if the methyl ethyl ketone, used in the above example, is substituted by an equi-molecular proportion of a higher ketone. In this manner I may make keto-alcohols of the general type formula

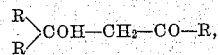

in which the three R's represent alkyl groups of which not all are the same and of which at least one is a methyl group. The alkyl group or groups other than the methyl may be ethyl, isopropyl, propyl, butyl, secondary butyl, amyl, or other alkyl radical containing at least two carbon atoms.

The keto-alcohols invented by me are useful in pyroxylin compositions. Those made from the interaction of acetone with other ketones containing four to seven carbon atoms, in liquid form, are active solvents for pyroxylin, have odors suggestive of diacetone alcohol, and cannot be distilled at atmospheric pressure without decomposition, particularly if a trace of alkali is present. If distilled under a pressure of 22 mm. of mercury these compounds boil at temperatures above 66° C. The keto-alcohols are resolved into their constituent ketones upon treatment with an alkali. Decomposition also results when they are brought into contact with a strong acid. Both these reactions are accelerated by heat.

It will be understood that methods of preparation other than the one given may be used in the preparation of the keto-alcohols.

When the method of preparation is that of condensation in the presence of an alkali, the alkali used may be hydrated lime or finely ground sodium or potassium hydroxide, suitably mixed with a distending agent, as, for example, calcium carbonate or calcium sulfate. The amount of alkali used may be about 10% of the weight of ketones, when lime is used, or 0.02 to 2.0% when finely ground caustic alkalies are used. The temperature of reaction may be somewhat above or below atmospheric, as, for example, 50° to —20° C., say, 0° C. The continuous process described may be substituted by a batch process in which the mixture of ketones is treated with the alkaline condensing agent until equilibrium in the reaction is approached, the mixture then filtered to remove undissolved alkali, the filtrate neutralized or made slightly acidic with a weak acid, such as succinic, and the neutralized liquid then distilled to remove low boiling ingredients and leave a residue comprising keto-alcohols.

By the term "keto-alcohol", as used in the specification and claims, I mean a compound containing both the ketone and the alcohol group, as illustrated in the formulas above.

I claim:—

1. A keto-alcohol of the formula

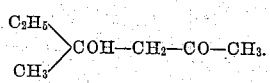

2. A keto-alcohol whose composition may be represented by the general formula

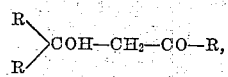

in which the R's represent alkyl groups, at least one of which is the methyl group and another of which is not.

3. A keto-alcohol whose composition may be represented by the general formula

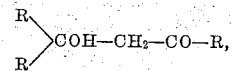

in which the R's represent alkyl groups of which at least one is the methyl and another is the ethyl group.

4. A keto-alcohol whose composition may be represented by the general formula

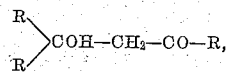

in which the R's represent alkyl groups of which two are methyl groups and the other is the ethyl group.

5. A keto-alcohol whose composition may be represented by the general formula

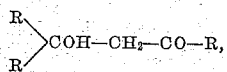

in which the R's represent alkyl groups of which two are methyl groups and the other is a different alkyl group.

ROBERT H. VAN SCHAACK, Jr.